US009050227B1

(12) United States Patent
Hargroder

(10) Patent No.: US 9,050,227 B1
(45) Date of Patent: Jun. 9, 2015

(54) POWER BASE ATTACHMENT

(71) Applicant: Todd Hargroder, San Antonio, TX (US)

(72) Inventor: Todd Hargroder, San Antonio, TX (US)

( * ) Notice: Subject to any disclaimer, the term of this patent is extended or adjusted under 35 U.S.C. 154(b) by 0 days.

(21) Appl. No.: 14/581,833

(22) Filed: Dec. 23, 2014

Related U.S. Application Data

(63) Continuation of application No. 14/121,856, filed on Mar. 17, 2014.

(60) Provisional application No. 61/800,782, filed on Mar. 15, 2013.

(51) Int. Cl.
*A61G 5/04* (2013.01)
*B62B 5/00* (2006.01)
*A61G 5/10* (2006.01)
*F16B 19/00* (2006.01)

(52) U.S. Cl.
CPC ................ *A61G 5/047* (2013.01); *A61G 5/104* (2013.01); *F16B 19/00* (2013.01); *A61G 2005/1078* (2013.01); *A61G 2005/1089* (2013.01)

(58) Field of Classification Search
CPC ...................................................... A61G 5/047
USPC ................................................ 180/11, 12, 15
See application file for complete search history.

(56) References Cited

U.S. PATENT DOCUMENTS

| | | | | |
|---|---|---|---|---|
| 5,351,774 | A * | 10/1994 | Okamoto | 180/65.1 |
| 6,273,212 | B1 | 8/2001 | Husted et al. | |
| 6,481,514 | B2 * | 11/2002 | Takada | 180/11 |
| 6,860,347 | B2 * | 3/2005 | Sinclair et al. | 180/11 |
| 6,935,448 | B2 * | 8/2005 | Goertzen et al. | 180/65.1 |
| 7,886,854 | B2 * | 2/2011 | Chiu | 180/65.1 |
| 8,960,340 | B2 * | 2/2015 | Tallino | 180/11 |
| 2010/0300777 | A1 | 12/2010 | Tallino | |
| 2012/0080243 | A1 * | 4/2012 | Mulhern | 180/11 |
| 2014/0262575 | A1 * | 9/2014 | Richter | 180/167 |

OTHER PUBLICATIONS

Scanned images of ZX1 power add-on unit for manual wheelchairs found on www.beachmobility.com website, Beach Mobility, Inc. (7 pages).

Scanned images of SmartDrive power assist device for manual wheelchairs found on www.max-mobility.com, Max Mobility (32 pages).

Scanned image of a YouTube link to video on Invacare/Top End Zinger Power Add On (not on the market) http://www.youtube.com/watch?v=5MtzU4ZAd_o (running time 7:09 minutes) and photo shots of video slides (3 pages).

(Continued)

*Primary Examiner* — Tony Winner

(57) ABSTRACT

The disclosure describes an improved apparatus for converting a manually-powered wheelchair into an electrically powered wheelchair. The apparatus comprises a frame, at least one powered drive wheel, at least one motor powering said drive wheel, and at least one power base axle receiver capable of connecting with an existing axle receiver of a manually powered wheelchair. The apparatus further includes an anti-tip/counterbalance mechanism to prevent a user from losing control and falling backward when the power base attachment is connected. The apparatus uses the existing axle receiver of a manual wheelchair as a universal connection point and to maintain the center of gravity for a user.

30 Claims, 13 Drawing Sheets

(56) References Cited

OTHER PUBLICATIONS

Brochure entitled "e-fix—electrical add-on drive control unit" (7 pages) published by Frank Mobility E-Motion showing power attachments for manual wheelchairs found on www.frankmobility.com/e-motion.php.

Brochure entitled "e-fix—Getting to know the basics . . . " (6 pages) published by Frank Mobility E-Motion showing power attachments for manual wheelchairs found on www.frankmobility.com/e-motion.php.

Brochure entitled "e-motion—power assist for wheelchairs" (8 pages) published by Frank Mobility E-Motion showing power attachments for manual wheelchairs found on www.frankmobility.com/e-motion.php.

Brochure entitled "Adventure" (16 pages) published by Frank Mobility E-Motion showing power attachments for manual wheelchairs found on www.frankmobility.com/e-motion.php.

Brochure entitled "viamobile—push and brake aid" (8 pages) published by Frank Mobility E-Motion showing power attachments for manual wheelchairs found on www.frankmobility.com/e-motion.php.

Brochure entitled "The Duet—wheelchair bicycle tandem" (4 pages) published by Frank Mobility E-Motion showing power attachments for manual wheelchairs found on www.frankmobility.com/e-motion.php.

Brochure entitled "Scalamobile iq—mobile stair climber" (8 pages) published by Frank Mobility E-Motion showing power attachments for manual wheelchairs found on www.frankmobility.com/e-motion.php.

Brochure (4 pages) published by Clinton River Medical Products for Tailwind power-assist wheelchair found on www.clintonrivermedical.com.

* cited by examiner

POWER BASE ATTACHMENT

CROSS-REFERENCES TO RELATED APPLICATIONS

This application is a continuation of U.S. patent application Ser. No. 14/121,856, filed on Mar. 17, 2014, which claims the benefit of U.S. Provisional Application Ser. No. 61/800,782 filed Mar. 15, 2013. The contents of these applications are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to the field of wheelchairs. Specifically, this invention relates to a wheeled power attachment that converts a manually powered wheelchair into an electrically powered wheelchair.

2. Description of the Related Art

Manually powered wheelchairs come in a variety of sizes for a variety of purposes. Two of the most common are the standard folding wheelchair and the non-folding rigid frame wheelchair 1 (as seen in FIG. 1) designed for more active and mobile individuals. Manually powered wheelchairs, regardless of the type of frame, generally include a frame 2, seating portion 3, backrest 4, front castor wheels 5, and rear wheels 6 having push rims 7. Each rear wheel 6 has an axle receiver 8 that is aligned with an axle receiver 9 that is connected, directly or indirectly, to the frame 2. A pin 10 locks each rear wheel 6, through its axle receiver 8, to the frame 2 through axle receiver 9. The wheelchairs are powered by the operator gripping the push rims 7 and pushing clockwise or counterclockwise for the specified direction and speed. However, there are some times when manual wheelchairs are not beneficial, such as propelling long distances, managing uneven terrain, or when the user's deficits are of such degree that manual propulsion becomes painful, exhaustive, or relatively impossible given time or circumstances. In these situations, electrically powered wheelchairs are desired to ease the burden and stress on the operator.

Electrically powered wheelchairs have several drawbacks including the expense, size and weight. Financial, storage, and transportation concerns often make it not practical, or possible, for a user to have both an electric powered and manually powered wheelchair. It is especially inconvenient when traveling to take both types of wheel chairs. Additionally, insurance carriers generally will not pay for a user to have both types of chairs.

As a result, there is a need for a wheeled power base attachment that can convert a manual wheelchair into an electric powered wheelchair. While power attachments for manual wheelchairs exist, those in the prior art do not replace the large rear push wheels, are not controlled by a joystick, do not keep the same height as the manual wheelchair, do not support the necessary posture and positioning of the user, and/or do not have an anti-tip/counterbalance mechanism. None of the prior art power attachments provide for connection through the axle receivers of the standard wheelchair. The failure to attach at the axle receiver makes the prior art attachments more difficult to attach to all types of manual wheelchairs as it generally results in a changed center of gravity for the user. Additionally, the failure of the prior art to allow for removal of the rear wheels complicates operation of the electric powered wheelchair by making maneuverability difficult by retaining the cumbersome large rear wheels despite no longer serving a purpose.

SUMMARY OF THE INVENTION

The present invention converts a manually powered wheelchair into a powered wheelchair by replacing the rear wheels with a power base attachment. The power base attachment consists of drive wheels powered by an electric motor that are operably controlled by a user-controlled joystick. The power base attaches to the manually powered wheelchair frame through the existing axle receivers used to connect the rear wheels. The power base attachment is adjustable to fit manually powered wheelchairs of different heights and widths. Utilization of the existing axle receivers for attachment of the power base maintains the user's center of gravity necessary for balance and function. The power base attachment also includes an anti-tip/counterbalance mechanism that connects between the manually powered wheelchair frame and the frame of the power base attachment. As a user leans backwards in the converted manually powered wheelchair, the anti-tip/counterbalance mechanism slows the backward rotation of the user by resisting the rotational force and then biasing the backrest toward the normal position for safety and stability.

DETAILED DESCRIPTION

Figure 1:
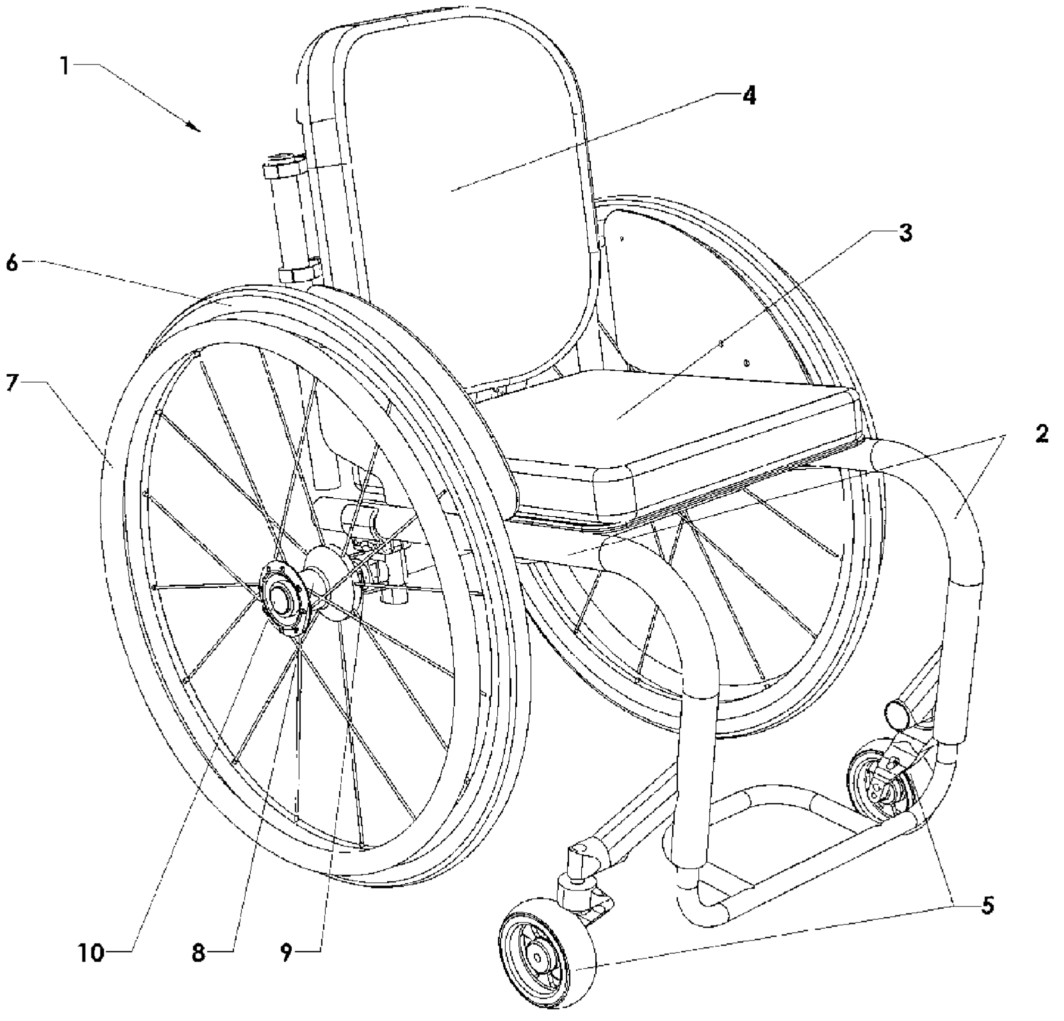
Fig. 1 (Prior art)
FIG. 1 is a profile view of a standard rigid frame manually powered wheelchair.
Figure 2:
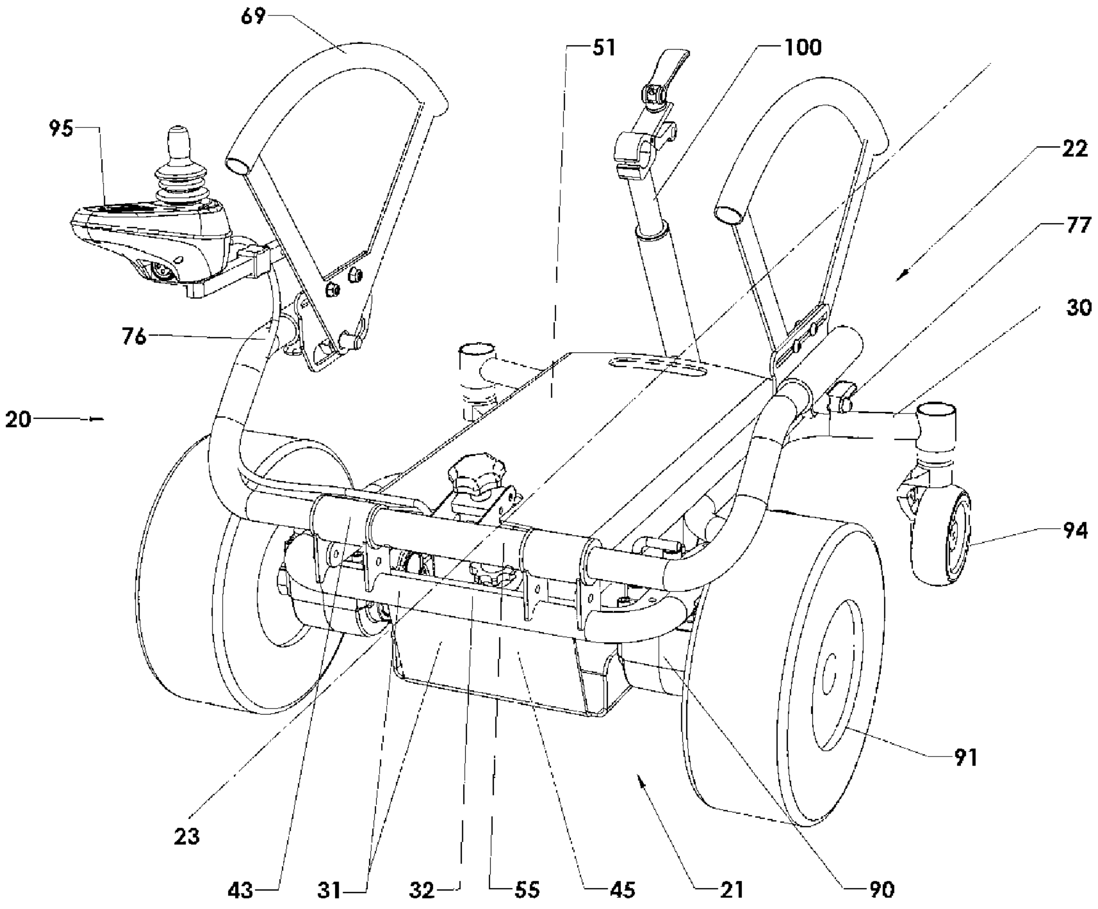
FIG. 2 is a profile front view of the disclosed embodiment.

FIG. 2 discloses the power base attachment 20 which comprises a frame 30, powered drive wheels 91, rear castor wheels 94, hand rails 69, axle receiver 76, electrically powered motors 90 in electrical communication with a joystick module 95, and an anti-tip/counterbalance mechanism 100.

Figure 3:
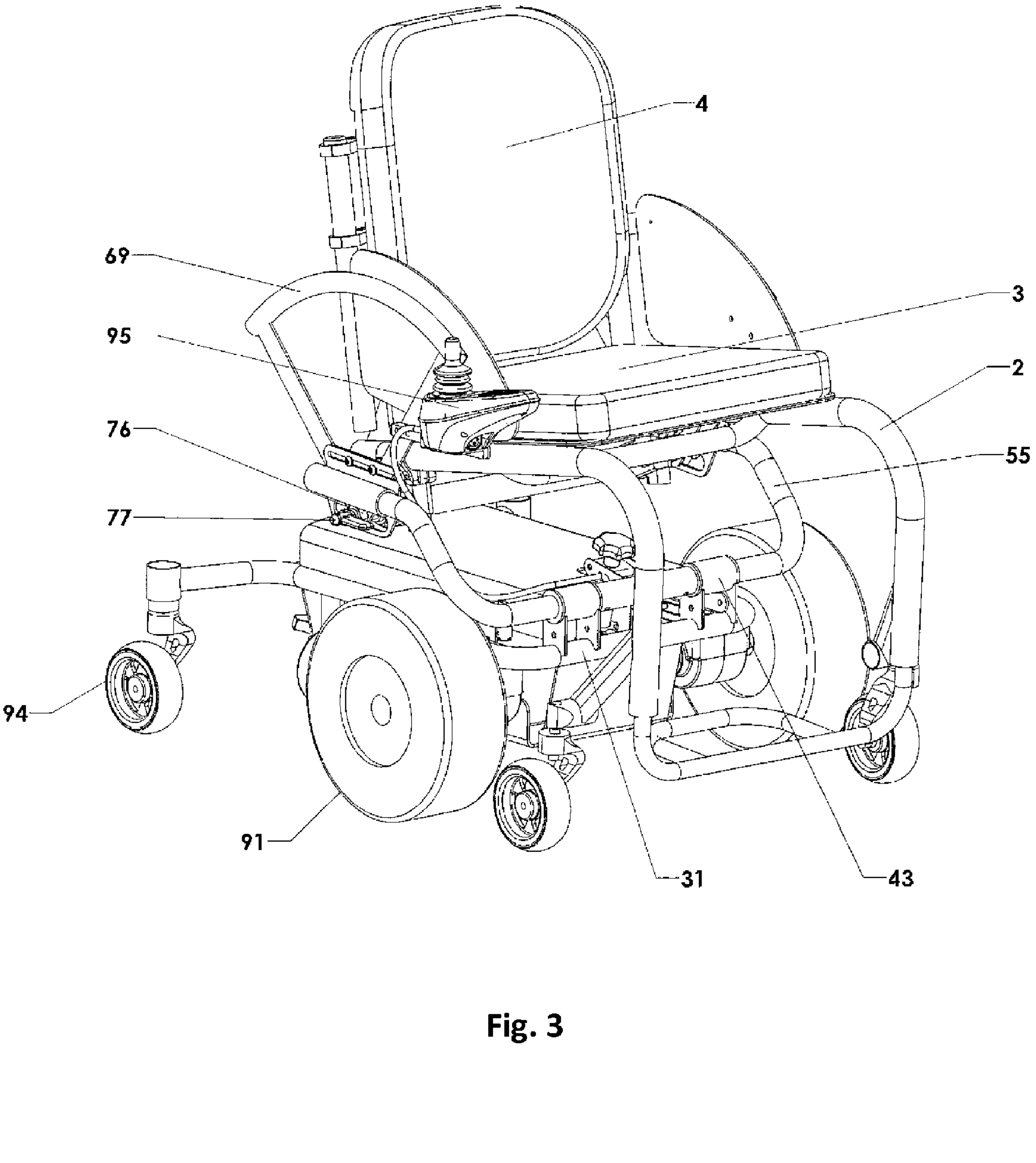
FIG. 3 is a profile front view of the disclosed embodiment attached to a standard rigid frame manually powered wheelchair.
Figure 4:
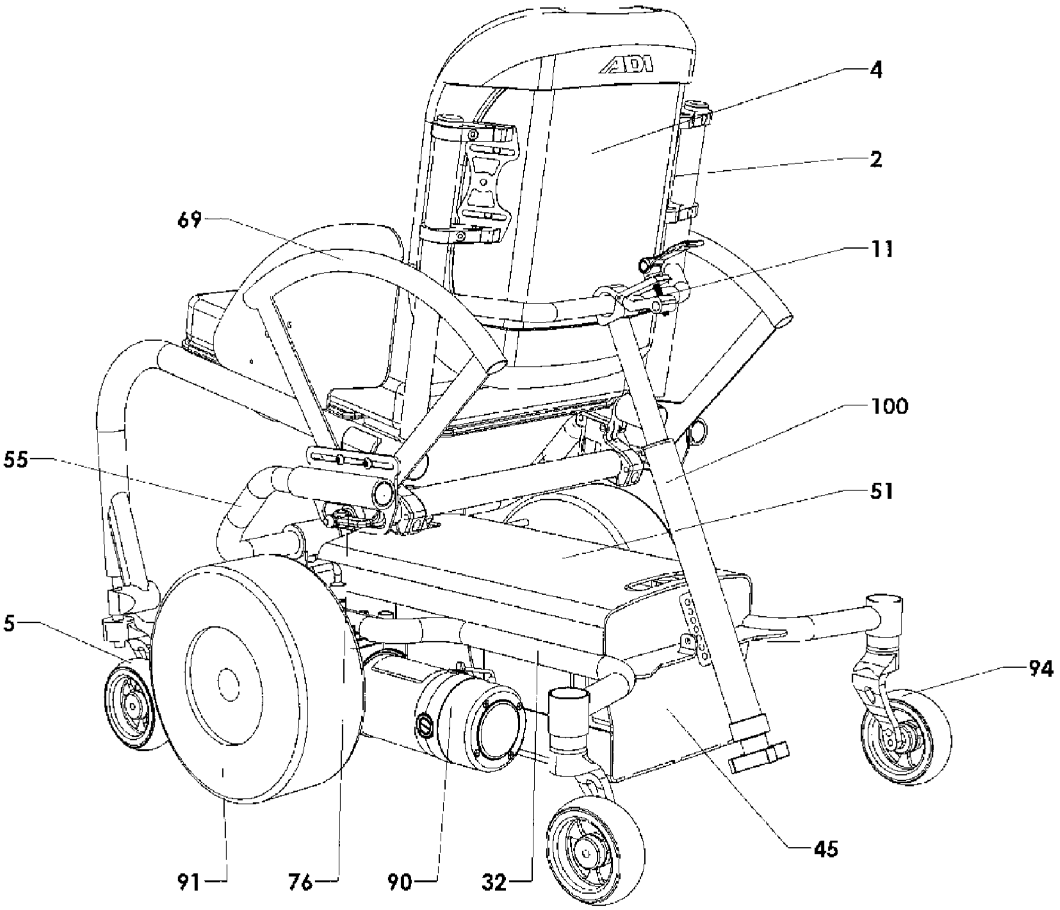
FIG. 4 is a profile rear view of the disclosed embodiment attached to a standard rigid frame manually powered wheelchair.

FIGS. 3 and 4 disclose a front and rear side profile views, respectively, of the power base attachment 20 connected to the frame 2 of a manually powered wheelchair 1. The power base attachment 20 is positioned underneath the seating portion 3 of the manually powered wheelchair 1 where the front end 21 is positioned proximal to the front castor wheels 5 and the back end 22 extends beyond the backrest portion 4.

Figure 5:
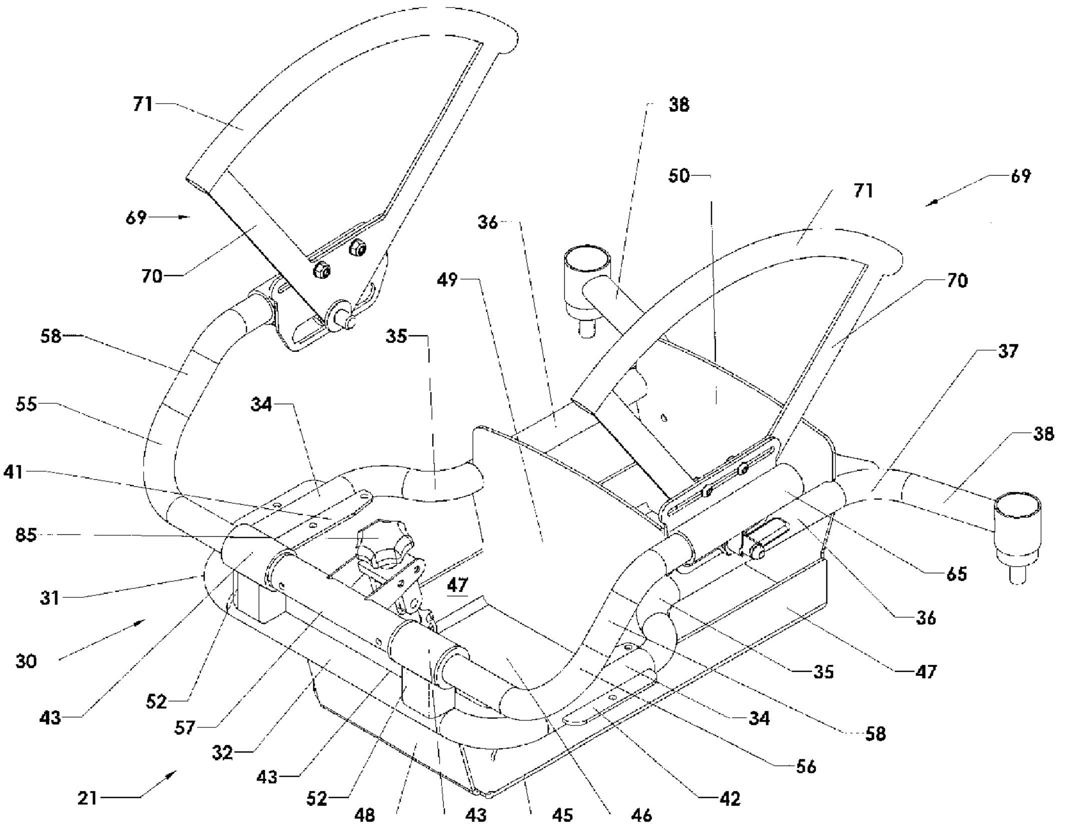
FIG. 5 is a profile front view of the frame of the disclosed embodiment.
Figure 6:
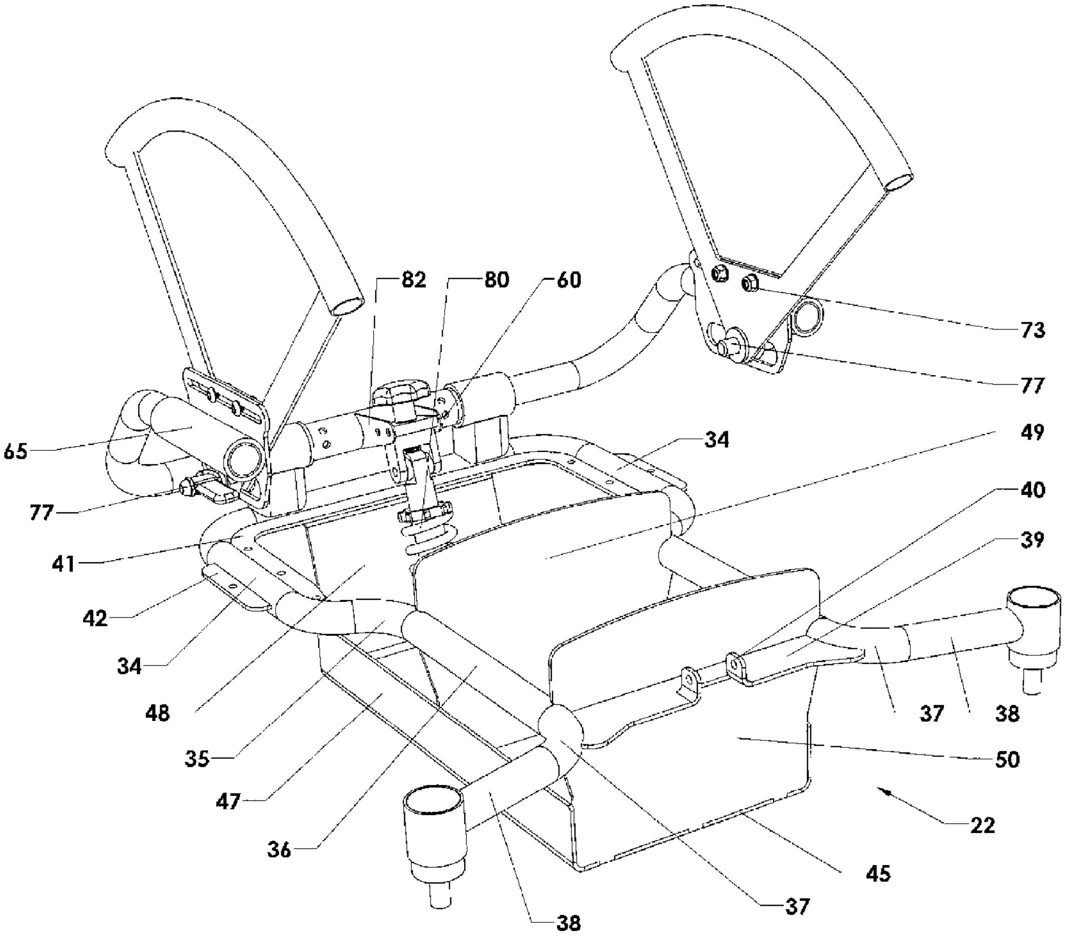
FIG. 6 is a profile rear view of the frame of the disclosed embodiment.

FIGS. 5 and 6 further disclose the frame 30 of power base attachment 20. The frame 30 consists of a rigid portion 31 and an adjustable portion 55. The rigid portion 31 consists of a support frame 32 and a housing 45. The support frame 32 comprises a front lateral member 33, wide longitudinal members 34, first elbow members, 35, narrow longitudinal members 36, second elbow members 37, rear side members 38, and a rear lateral member 39. The front lateral member 33 is positioned at the front end 21 of the power base attachment 20 and is perpendicular to the longitudinal axis 23 of the power base attachment 20. Wide longitudinal members 34 extend from the lateral ends of the front lateral member 33 towards the back end 22 of the power base attachment 20. First elbow members 35 are positioned between each wide longitudinal member 34 and the narrowed longitudinal member 36. The first elbow member 35 is angled perpendicularly toward the longitudinal axis 23 of the power base attachment 20 such that the distance between the narrowed longitudinal members 36 is smaller than the distance between the wide longitudinal members 34. Second elbow members 37 are positioned between each of the narrowed longitudinal members 36 and each of the rear side members 34. Each wide longitudinal member 34, first elbow member 35, narrowed longitudinal member 36, second elbow member 37, and short lateral member 38 are mirrored across the longitudinal axis 23 of the power base attachment 20. The rear lateral member 39 is positioned between the two second elbow members 37 and is parallel to the front lateral member 33. A rear lateral bracket 40 is positioned at the approximate midpoint of the rear lateral member 39. Preferably, the front lateral member 33, wide longitudinal members 34, first elbow members 35, narrowed longitudinal members 36, second elbow members 37, rear side members 38, and rear lateral member 39 are positioned in the same plane. The front lateral member 33 and wide longitudinal members 34 have a first flange 41 extending into the interior space defined by the support frame 32. Each wide longitudinal members 34 have a second flange 42 extending outwardly from the support frame 32 opposite from the first flange 41. Two mounting sleeves 43 are mounted on the front lateral member 33 with mounting brackets 52. The longitudinal axes of the mounting sleeves 43 are aligned and parallel to the front lateral member 33. Each mounting sleeve 43 is positioned on either side of the longitudinal axis 23 of the power base attachment 20.

The housing 45 of the rigid portion 31 of the frame 30 comprises a bottom panel 46, two longitudinal side panels 47, front panel 48, middle panel 49 and rear panel 50. The bottom panel 46 is parallel to the support frame 32 and is connected to the support frame 32 by the front panel 48, middle panel 49 and rear panel 50. The front panel 48 is connected to the flange 41 and extends at an angle to the bottom panel 46. The middle panel 49 is attached to the support frame 32 between the first elbow members 35 and narrow longitudinal members 36 and extends perpendicular relative to the longitudinal axis 23. The middle panel 49 also connects to the bottom panel 46 and longitudinal side panels 47 and end extends slightly above the support frame 32. The rear panel 50 is attached to the support frame 32 between the narrow longitudinal members 36 and second elbow members 37 and is positioned perpendicular relative to the longitudinal axis 23. The rear panel 50 connects to the bottom panel 46, longitudinal side panels 47, and rear lateral member 39 and extends above the support frame 32.

Figure 7:
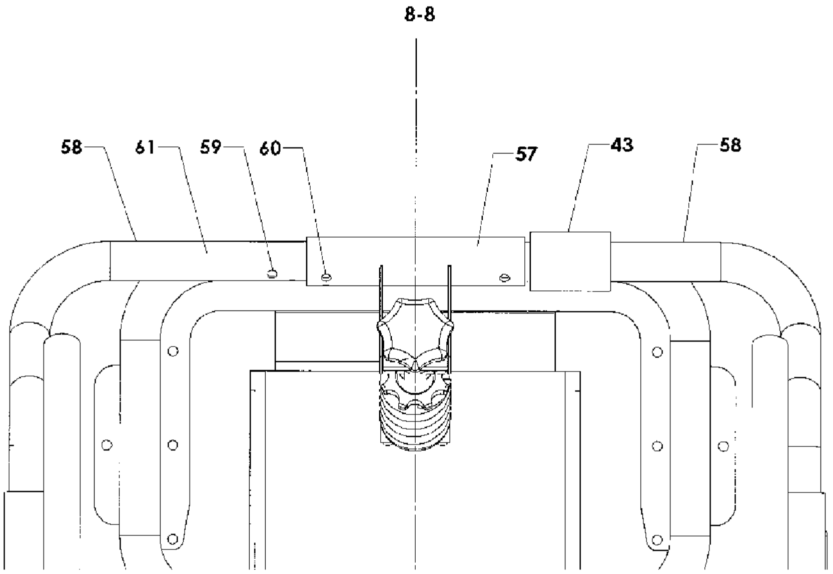
FIG. 7 is a top view of the frame of the disclosed embodiment with one mounting sleeve removed.

Referring to FIGS. 5, 6, and 7, the adjustable portion 55 consists of a generally U-shaped swing arm 56 having a middle member 57 and two extending side arms 58. The middle member 57 is positioned parallel and pivotally mounted to the front lateral member 33 through the mounting sleeves 43. Each of the two extending side arms 58 of the swing arm 56 generally extend from the middle member 57 towards the back end 22 of the power base attachment 20. Each of the side arms 58 have telescoping portions 61 which extend outwardly from each lateral end of the middle member 57 in a direction parallel to the middle member 57. The telescoping portions 61 have a smaller circumference than the middle member 57 and telescopically insert within the middle member 57. Each telescoping portion 61 also has a series of holes 59 equally spaced along the length of the telescoping portion 61. The side arms 58 may be pulled out of the middle member 57 or pushed into the middle member 57 depending on the width needed. Once the proper width is determined, a specific hole 59 on the telescoping portion 61 is aligned with a hole 60 on the middle member 57. A bolt or locking pin is inserted into the hole 60 on the middle member 57 and into the hole 59 of the telescoping portion 61 which secures the side arms 58 to the middle member 57 and prevents further lateral movement. The side arms 58, through the telescoping portions 61, extend laterally from the middle member 57 then angle towards the rear end 22 of the power base attachment 20. The angled portion extends upwards over the drive wheels 91 relative to the support frame 32 before becoming parallel and bend at approximately the centerpoint of their length to extend generally parallel to the longitudinal axis 23 of the power base attachment 20.

Figure 11:
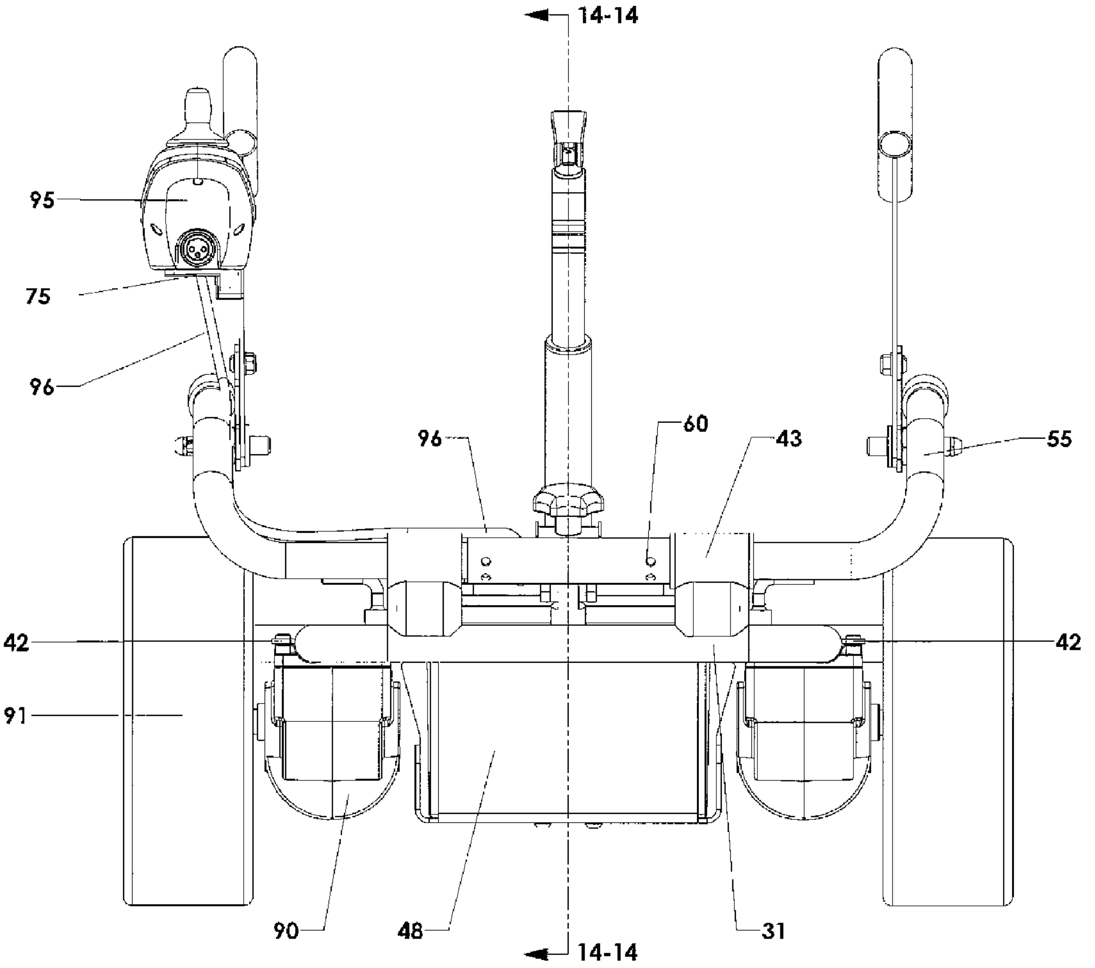
FIG. 11 is a front view of the disclosed embodiment.

Referring to FIGS. 5, 6, 9 and 10, a sleeve 65 is positioned proximal to each rear terminal end of the side arms 58 of the swing arm 56. Attached to each sleeve 65 is an axle plate 66 having a lateral slot 67 positioned below the sleeve 65 and an adjustment slot 68 positioned above the sleeve 65. Each axle plate 66 is positioned on the exterior of the sleeve 65 on the side that faces the longitudinal axis 23. A hand rail 69, having a frame member 70 and hand rail member 71, is attached to the axle plate 66. Frame member 70 forms a "V" shape with a bore hole 72 positioned proximal to the apex. Frame member 70 is secured to the axle plate 66 through bolts or pins 73 which extend through the adjustment slot 68 of the axle plate 66 and holes 74 in the frame member 70. Extending from one of the frame members 70 is a joystick module bracket 75 (as seen in FIG. 11). Hand rail 69 is designed to mimic the push rim 7 of the rear wheel 6 of an industry standard manually powered wheelchair 1. Each sleeve 65 with the hand rail 69 and axle plate 66 may rotate towards the longitudinal axis 23 of the power base attachment 20 for convenient storage when not in use.

A power base axle receiver 76, having an axle bore (not shown) there through, is mounted to each axle plate 66 within the lateral slot 67. The axle bore (not shown) is aligned with the bore hole 72 of the frame member 70. The power base axle receiver 76 may be adjusted for and aft in a direction parallel to the longitudinal axis 23 of the power base attachment 20 by moving the hand rail 69 through the adjustment slot 68. This allows the axle receiver 76 to slide in the for/aft position within the lateral slot 67. Preferably, each axle receiver 76 is adjusted to the same forward/aft position.

The axle bore of the power base axle receiver has a diameter that is equal, or similar, to the diameter of the axle bore of the axle receiver 9 of the manually powered wheelchair 1. A pin 77, having industry standard locking mechanisms, including deployment of recessed bearings or a latching pin, is positioned in the axle bore (not shown) of the power base axle receiver 76. It is industry standard for the axle bore to fit a 0.5 inch pin. The axle plate 66 may be made in a variety of different shapes so long as an axle receiver 76 is mounted proximal the terminal end of the swing arm 56.

Figure 8:
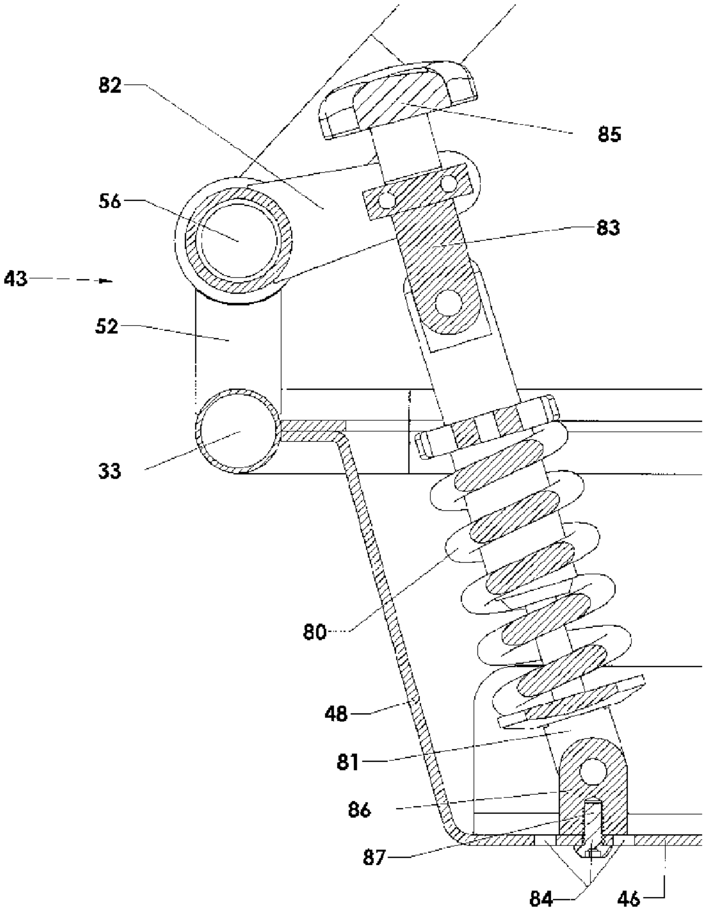
FIG. 8 is a cross section of line 8-8 in FIG. 7
Figure 9:
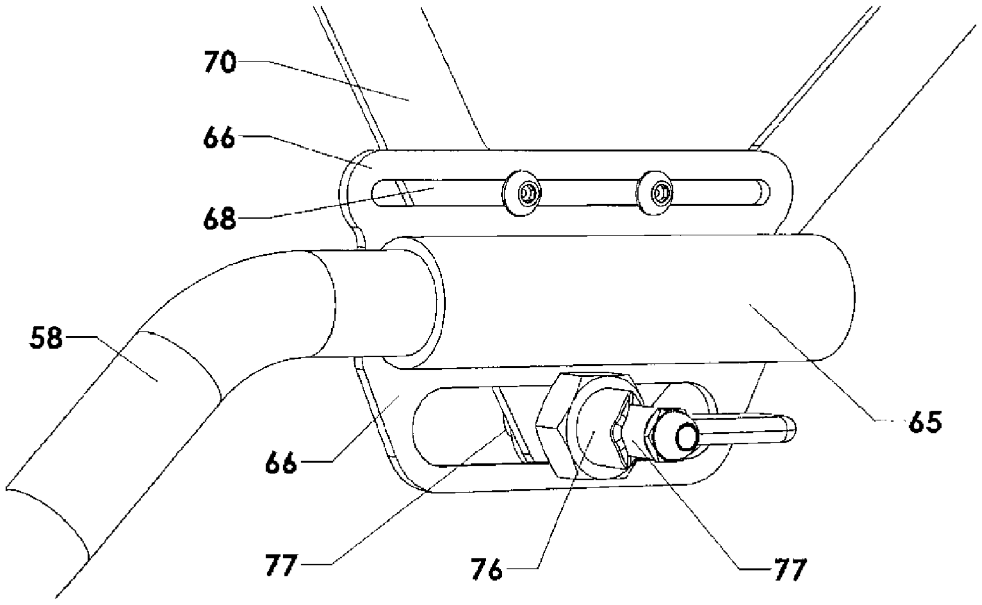
FIG. 9 is the exterior view of the frame mounted axle plate and axle receiver of the disclosed embodiment.
Figure 10:
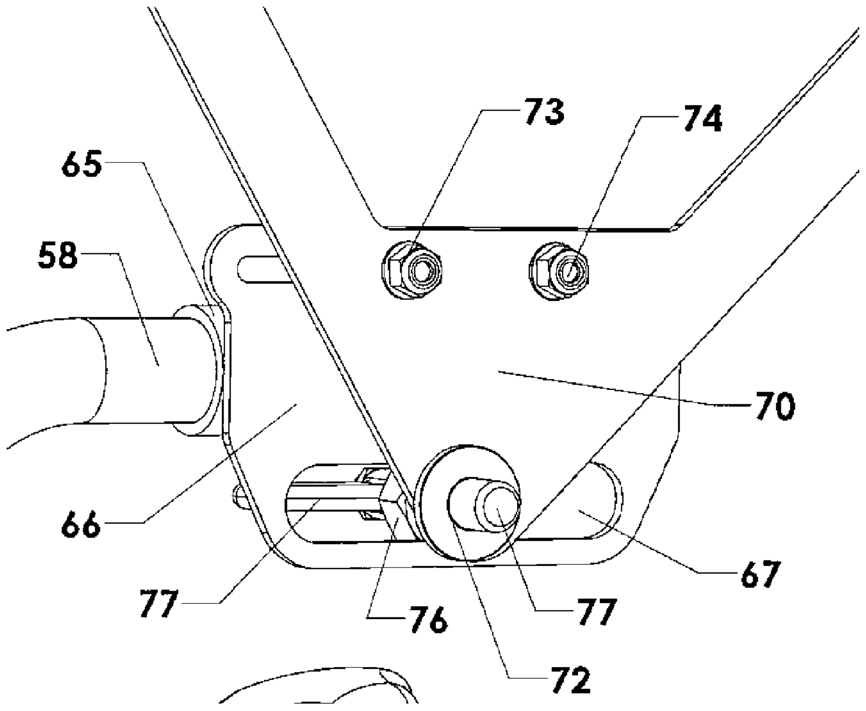
FIG. 10 is the interior view of the frame mounted axle plate and axle receiver of the disclosed embodiment.

Referring to FIG. 8, a shock absorber 80 or dampener is positioned in alignment with the longitudinal axis 23 of the power base attachment 20. The shock absorber 80 is attached at its lower end to the bottom panel 46 of the rigid portion 31 of the frame 30 through a lower shock mount 81 connected to a lower bracket 86 extending from the bottom panel 46. The shock absorber 80 is attached at its upper end to an upper bracket 82 extending from the middle member 57 of the swing arm 56 through an upper shock mount 83. The upper bracket 82 is positioned along the midpoint of the middle member 57 and extends away from the middle member 57 towards the back end 22 of the power base attachment 20. The lower bracket 86 is connected to the bottom panel 46 with a bolt or pin 87 through one of a series of holes 84 in the bottom of panel 46. The position of the lower bracket 86 on the bottom panel 46 may move toward the front or rear end of the bottom panel 46 by connecting the lower bracket 86 through a different hole 84.

The height of the terminal ends of the side arms 58 of the swing arm 56 may be adjusted through movement of the shock absorber 80. As the lower bracket 86 and lower shock mount 81 are moved toward the front of bottom panel 46, the shock absorber 80 becomes more perpendicular in relation to the longitudinal axis 23, effectively raising the upper end of shock absorber 80. As a result, the upper shock mount 83 is raised causing the upper bracket 82, and resulting swing arm 56, to rotate upwards within the mounting sleeves 43. As the swing arm 56 rotates up, the side arms 58 and the power base axle receivers 76 correspondingly rotate upwards effectively raising the position of the power base axle receivers 76 relative to the rigid portion 31 of the frame 30. Consequently, lower bracket 86 may be adjusted along the longitudinal axis 23 to accommodate varying rear wheel sizes of the manually powered wheelchair such as 24, 25, and 26 inch diameters. Additionally, the attachment point of the upper shock mount 83 to the upper bracket 82, may be similarly adjusted to various positions on the upper bracket 82 and effectively change the height of the power base axle receiver.

Figure 12:
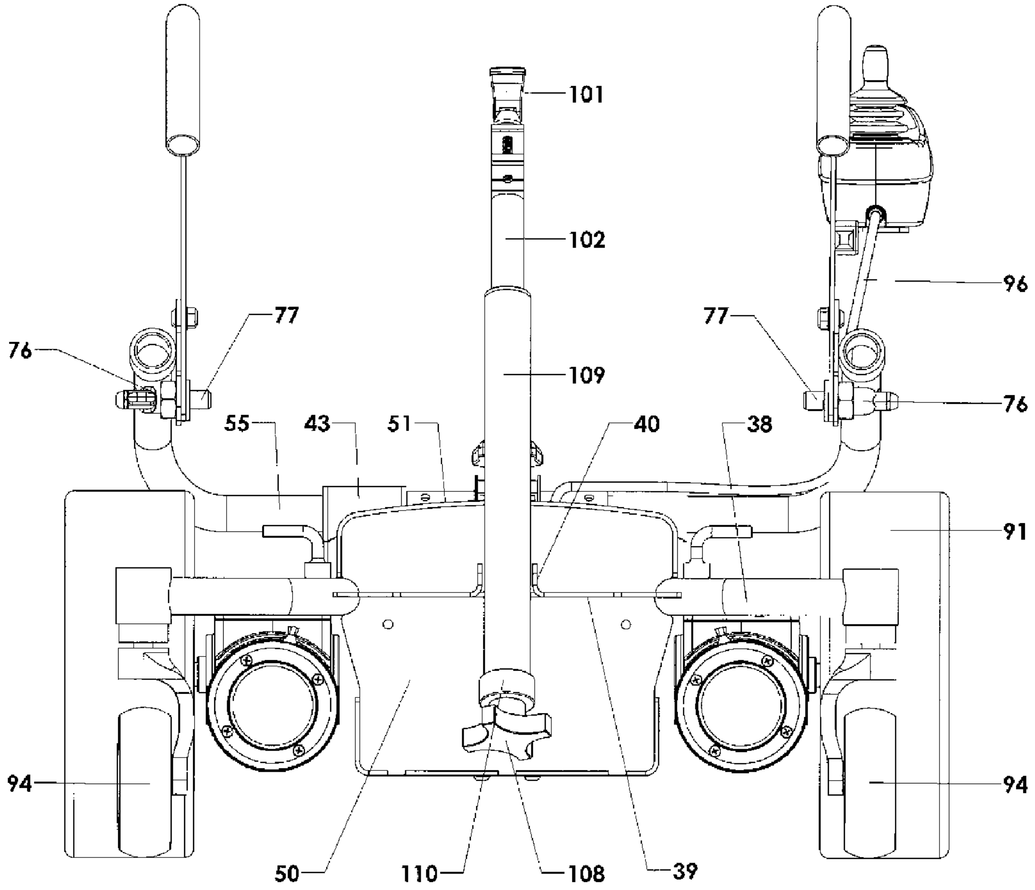
FIG. 12 is a rear view of the disclosed embodiment.
Figure 13:
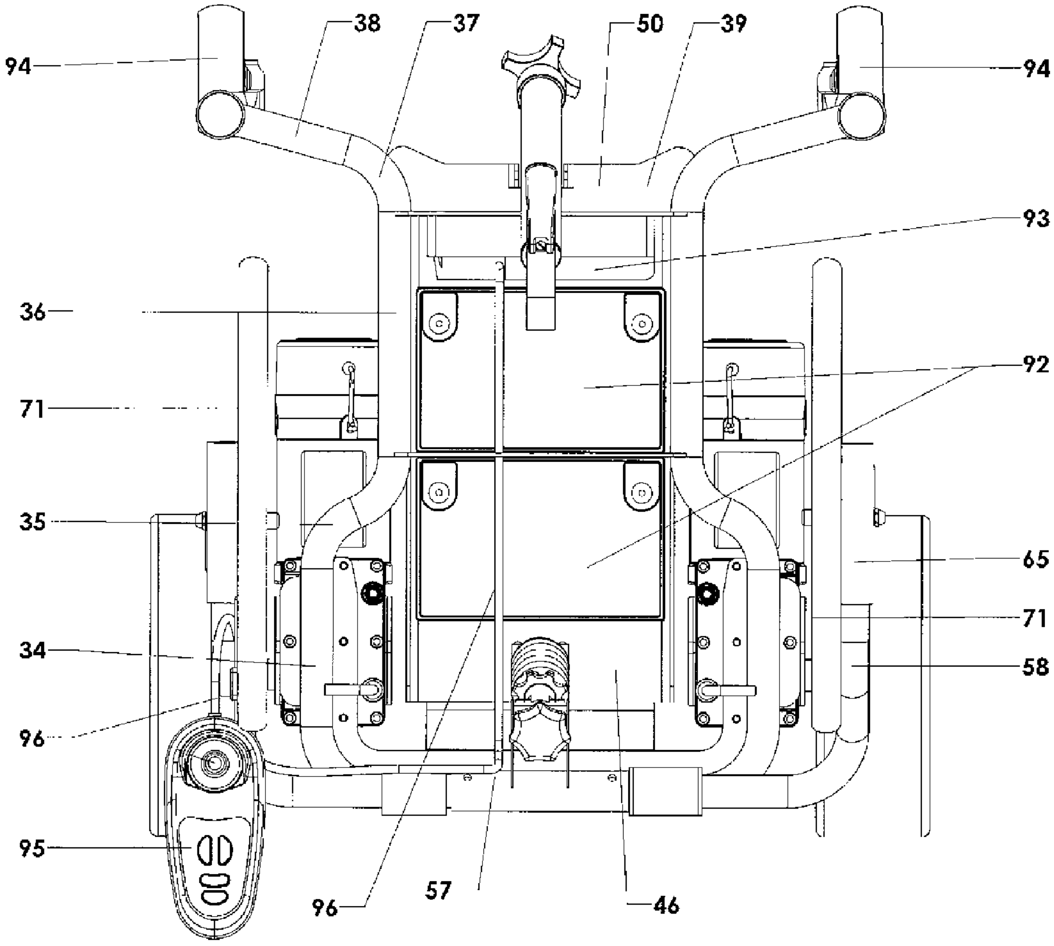
FIG. 13 is a top down view of the disclosed embodiment without the housing cover.

Referring to FIGS. 11, 12, and 13, an electric motor 90 is attached to each wide longitudinal member 34 through attachment to the flange 41 and mirrored flange 42. Each electric motor 90 is positioned between the drive wheel 91 and a longitudinal side panel 47 of the housing and powers one of the drive wheels 91. In the preferred embodiment, two batteries 92 and a controller 93 are positioned within the housing 45. A removable housing cover 51 is placed over the housing 45 and secured over the middle panel 49 and rear panel 50 (as seen in FIG. 2).

Still referring to FIGS. 12 and 13, two castor wheels 94 are mounted to the terminal ends of each rear side member 38 of the support frame 32. Each castor wheel 94 is able to rotate freely 360 degrees around a vertical axis. A joystick module 95 is attached to the joystick module bracket 75. A wire or cable 96 extends from the joystick module 95, along the swing arm 56, into the housing 45 and to the controller 93. The controller 93 is electrically connected to each battery 92 and to the respective electric motors 90.

Figure 14:
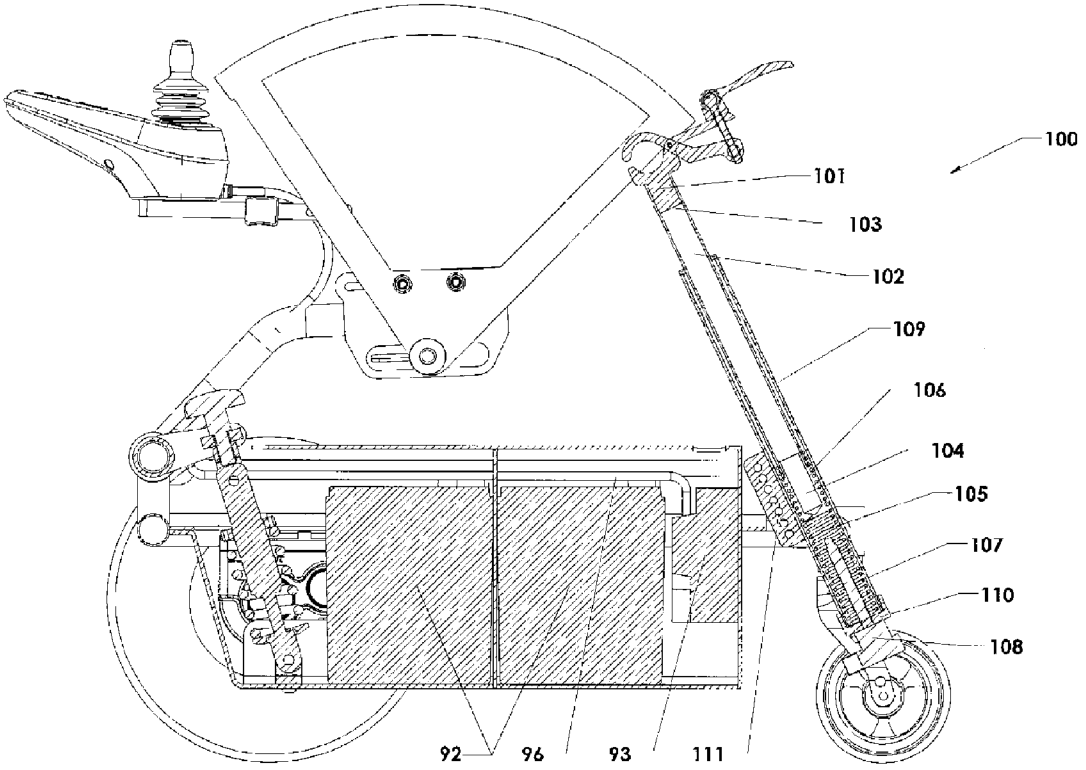
FIG. 14 is a cross section of line 14-14 in FIG. 11.

Referring to FIGS. 4 and 14, an anti-tip/counterbalance mechanism 100 is attached to the rear lateral bracket 40 of the rear lateral member 39. The anti-tip/counterbalance mechanism 100 is comprised of a latch 101, rod 102, spring 105, sleeve 109, base cap 110 and an adjustable pivot joint 111. The latch 101 is positioned at to the upper end 103 of the rod 102. The lower end 104 of the rod 102 is positioned within the sleeve 109 and arranged for engagement with a spring 105. The lower end 104 of the rod 102 has a smaller circumference than the remainder of the rod 102. The upper end 106 of the spring 105 coils around the lower end 104 of the rod 102 and engages a shoulder created by the smaller circumference of the lower end 104. The lower end 107 of the spring 105 abuts the base cap 110. The base cap 110 encapsulates the lower end of the sleeve 109. A spring adjustment screw 108 is attached to the base cap 110 and may be used to increase or reduce the base line compression of the spring 105 to allow a user a stiffer anti-tip support or a looser anti-tip support. The rod 102 is telescopically arranged with the sleeve 109 in that as the rod 102 is compressed, the rod 102 slides within the sleeve 109. The spring 105 allows for resilient compression and returns the rod 102 to a static position when no compressive force is applied. An adjustable pivot joint 111 attaches the sleeve 109 to the rear lateral bracket 40. This pivot joint 111 allows the anti-tip/counterbalance mechanism 100 to rotate around a pivot point on the rear lateral bracket 40. The sleeve 109 may be adjusted up or down in relation to the rear lateral member 39 by changing the pivot point that attaches the sleeve 109 to the rear lateral bracket 40.

The latch 101 attaches to an upper frame member 11 located behind the backrest portion 4 of a standard manually powered wheelchair 1. In the disclosed embodiment the latch 101 is a clamp but other standard latching mechanisms are anticipated so long as the clamping system allows the latch to rotate slightly in relation to the upper frame member during compression. For wheelchairs that do not have an upper frame member for the anti-tip/counter balance mechanism 100 to attach to, an upper cross beam is added (not shown). The upper cross beam connects to the latch as described above and the upper cross beam (not shown) attaches to upper vertical frame members of the standard wheelchair with a similar latching mechanism. In the disclosed embodiment, the pin 77 and axle receiver 76 may be integrally connected. In this embodiment, the pin is not removable from the axle receiver 76.

Figure 15:
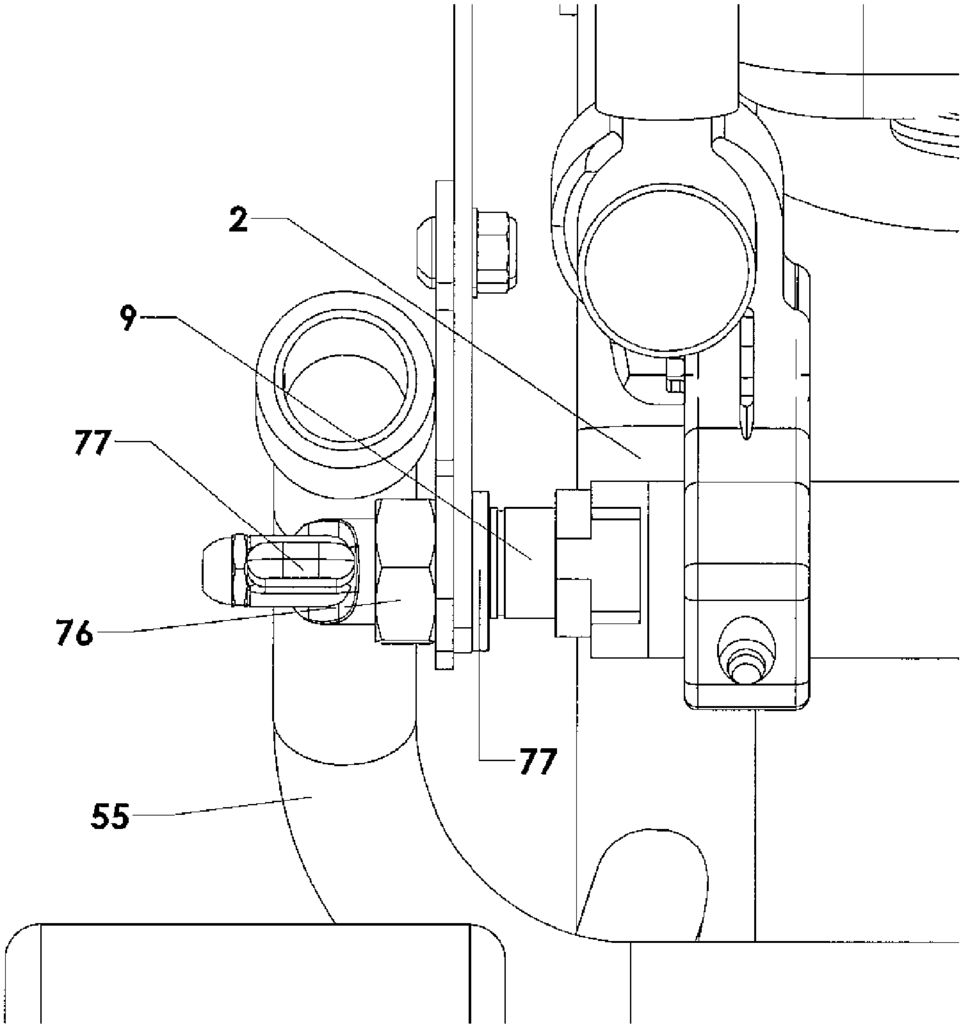
FIG. 15 is close up view of the disclosed embodiment attached to a manual wheelchair.

To connect the power base attachment 20 to a standard manually powered wheelchair 1, the pin 10 is removed from the axle receiver 9 of the industry standard manually powered wheelchair 1 and the two rear wheels are removed 6. The power base attachment 20 is positioned under the seating portion 3 such that the front end 21 of the power base attachment 20 is positioned behind the wheelchair's front castor wheels 5. The power base axle receivers 76 are adjusted for height as described supra through movement of the shock absorber 80. The distance between the power base axle receivers 76 is adjusted as described supra through adjustment of the telescoping portions 61 of the side arms 58. Once fully adjusted, the longitudinal axis of each power base axle receiver 76 is aligned with the longitudinal axis of the corresponding wheelchair axle receiver 9. As seen in FIG. 15, the pin 77 is positioned in the axle bore (not shown) of the power base axle receiver 76 and inserted into the axle bore of wheelchair axle receiver 9 of the manually powered wheelchair 1. In other embodiments the pin 77 may slide within the axle bore of the power base axle receiver, may be removed com completely from the axle bore of the power base axle receiver, or completely remain stationary within the axle bore of the power base axle receiver. Once positioned in the axle bore of the wheelchair axle receiver 9, the pin is secured through industry standard means including deployment of recessed bearings, latching pin, spring loaded pin, or other suitable means. The process is repeated for the remaining axle pin and axle receiver. In this manner, the front castor wheels 5, two drive wheels 91, and two rear castor wheels 94 are all in contact with level ground.

The anti-tip/counterbalance mechanism 100 is positioned so that the latch 101 attaches to the upper frame member 11 of the manually powered wheelchair 1. The pivot joint 111 is adjusted up or down to ensure the latch 101 is of the appropriate height to latch to the upper frame member 11. The latch 101 is clamped to the upper frame member 11. When secured, the latch 9 is located proximal to the center point of the upper frame member 11. The rear castor wheels also assist in stabilizing the wheelchair and provide added safety as an anti-tip/counterbalance mechanism. In some embodiments the two castor wheels may be replaced with a single castor wheel mounted along the longitudinal axis 23 of the power base attachment 20. In this embodiment, it is anticipated the rear castor wheel would be located further back from where the anti-tip/counterbalance mechanism 100 attaches to the rear lateral member 39.

Once the power base attachment 20 is secured, the distance from wheelchair axle receiver and the ground is identical to the height of the manually powered wheelchair with rear wheels. The hand rails 69 are in the approximately the same position as the push rims 7 of the preexisting rear wheels.

In operation, the user manipulates the joystick module 95 to control the direction and speed of the now electrically powered wheelchair. The joystick module 95 sends a signal to the controller 93 via a cable 96. The controller 93 processes the information and determines the direction and speed of each motor 90. The controller 93 sends this information to each respective electric motor 90 via a cable. The electric motor 90, powered by the battery 92, then operates the drive wheel 91 in a manner to correspond with the user's instructions from the joystick module 95. The controller and joystick provide for industry standard operation of an electrically powered wheelchair which allow for variable drive speed and direction control. Each electric motor is powered by a rechargeable battery. Typically, each electric motor runs on 24 volts and is a conventional motor used in the electric powered wheelchair industry. In the preferred embodiment there is at least 24 volts of battery powered either through a single battery or a combination of batteries. The controller 93 is electrically connected to the batteries 92 and supplies power to both electric motors 90 and the joystick module 95 through cables. As in standard operation for electrically powered wheel chairs, when the joystick is placed in neutral from a directional position, the electric motor decelerates to allow for a smooth stop. Once stopped and when the joystick is in neutral the drive wheels are locked to prevent movement of the wheelchair when positioned on inclines or uneven terrains.

When the converted wheelchair is in motion, the swing arm 56 and shock absorber 80 assist to dampen the movement of the power base attachment 20 in relation to the manual wheelchair frame 2. The user's center of gravity remains unchanged due to the power base attachment 20 having the same height and as the rear wheels of the standard wheelchair. The hand rail's 69 identical location to and conformity with the standard push rim, makes the user more comfortable as the hand rail is a familiar point of stability. A user may use the hand rail for transferring, positioning, lifting up for pressure management and for leaning forward.

The anti-tip/counterbalance mechanism 100 enables the wheelchair attached to the power base attachment 20, to respond as if the manually operated wheels were still attached. The anti-tip/counter balance mechanism 100 allows the user to lean back to reduce pressure on lower extremities and to raise the front end castor wheels 5 several inches off the ground to overcome obstacles. The leaning back and raising of the front castor wheels 5 are accomplished by the user without changing the user's center of gravity. As the chair tilts back, the rod 102 compresses the spring 105, allowing the user to raise the front castors 5 or to lean back. After compression of the spring 105 during the tilting process, the spring 105 decompresses to push the rod 102, and resulting back rest and chair, towards the normal position. It is envisioned other anti-tip/counter balance mechanisms may be used to achieve the compression/decompression affect. A hydraulic cylinder, elastic, spring powered telescoping rod or other materials may be suitable to accomplish the compression and decompression mechanism. The anti-tip/counterbalance mechanism 100 assists user's ability to maintain balance as they overcome obstacles without having to adjust for the additional weight of the power drive attachment.

The present disclosure is described above in terms of a preferred illustrative embodiment of a power base attachment. Those skilled in the art will recognize that alternative constructions of such an apparatus can be used in carrying out the present invention. Other aspects, features, and advantages of the present invention may be obtained from a study of this disclosure and the drawings, along with the appended claims.

I claim:

1. A wheeled power base for driving a manual wheelchair comprising:

a frame;

at least one powered drive wheel attached to said frame;

at least one motor powering said drive wheel;

at least one power base axle receiver associated with said frame wherein a longitudinal axis of said power base axle receiver is positioned to align with a longitudinal axis of an axle receiver of the manual wheelchair;

a pin positioned in said at least one power base axle receiver said pin being insertable within said axle receiver of the manual wheelchair.

2. A wheeled power base as disclosed in claim 1 further comprising a manually operable control module in electrical communication with said at least one motor.

3. A wheeled power base as disclosed in claim 1 wherein said frame comprises an adjustable portion and a rigid portion.

4. A wheeled power base as disclosed in claim 3 wherein said at least one power base axle receiver is associated with said adjustable portion of said frame.

5. A wheeled power base as disclosed in claim 4 wherein said adjustable portion has a first adjustment portion that adjusts a height of said power base axle receiver relative to said rigid portion of said frame and second adjustment portion that adjusts a lateral position of said power base axle receiver.

6. A wheeled power base as disclosed in claim 5 wherein said first adjustment portion is rotatably mounted to said rigid portion wherein the height of said power base axle receiver can be adjusted between two or more positions relative to said rigid portion.

7. A wheeled power base as disclosed in claim 6 wherein a shock absorber is mounted between said first adjustment portion and said rigid portion.

8. A wheeled power base as disclosed in claim 1 further comprising at least one castor wheel mounted to said frame.

9. A wheeled power base as disclosed in claim 1 further comprising an anti-tip arm connected to said frame and positionable to connect to a frame of a manual wheelchair wherein said anti-tip arm is resiliently compressible along its longitudinal axis.

10. A wheeled power base as disclosed in claim 9 wherein said anti-tip arm comprises a rod having an inserting member and a receiving member wherein said inserting member is telescopically arranged with said receiving member.

11. A wheeled power base as disclosed in claim 10 wherein said anti-tip arm further comprises a compression member in said receiving member.

12. A wheeled power base as disclosed in claim 11 wherein said receiving member is pivotably connected to said frame.

13. A power converted manual wheelchair comprising:

a wheelchair frame;

a seat portion attached to said wheelchair frame;

a backrest portion attached to said wheelchair frame;

at least one wheelchair frame axle receiver associated with said wheelchair frame;

a power base associated with said wheelchair frame, said power base comprising:

a power base frame;

at least one powered drive wheel associated with said power base frame;

at least one motor powering said drive wheel;

at least one power base axle receiver associated with said power base frame wherein a longitudinal axis of said power base axle receiver is aligned with a longitudinal axis of said at least one wheelchair frame axle receiver;

a pin positioned in said at least one power base axle receiver, said pin being insertable within said wheelchair frame axle receiver.

14. A power converted manual wheelchair as disclosed in claim 13 further comprising a manually operable control module in electrical communication with said at least one motor.

15. A power converted manual wheelchair as disclosed in claim 13 wherein said power base frame comprises an adjustable portion and a rigid portion.

16. A power converted manual wheelchair as disclosed in claim 15 wherein said at least one power base axle receiver is associated with said adjustable portion of said frame.

17. A power converted manual wheelchair as disclosed in claim 16 wherein said adjustable portion has a first adjustment portion that adjusts the height of said power base axle receiver relative to said rigid portion of said frame and second adjustment portion that adjusts the lateral position of said power base axle receiver.

18. A power converted manual wheelchair as disclosed in claim 17 wherein said first adjustment portion is rotatably mounted to said rigid portion.

19. A power converted manual wheelchair as disclosed in claim 18 wherein a shock absorber is mounted between said first adjustment portion and said rigid portion wherein the height of said power base axle receiver can be adjusted between two or more positions relative to said rigid portion.

20. A power converted manual wheelchair as disclosed in claim 13 further comprising at least one castor wheel mounted to said power base frame.

21. A power converted manual wheelchair as disclosed in claim 13 further comprising an anti-tip arm connected between said wheelchair frame and said power base frame wherein said anti-tip arm is resiliently compressible along its longitudinal axis.

22. A power converted manual wheelchair as disclosed in claim 21 wherein said anti-tip arm comprises a rod having an inserting member and a receiving member wherein said inserting member is telescopically arranged with said receiving member.

23. A power converted manual wheelchair as disclosed in claim 22 wherein said anti-tip arm further comprises a compression member in said receiving member.

24. A power converted manual wheelchair as disclosed in claim 23 wherein said receiving member is pivotably connected to said frame.

25. A method for converting a manually powered wheelchair to a powered wheelchair comprising the steps of:

Removing at least one rear wheel from the manually powered wheelchair, said manually powered wheelchair having a frame and at least one axle receiver connected to said frame;

positioning a wheeled power base attachment in association with said manually powered wheelchair, said wheeled power base attachment comprising a frame, at least one axle receiver associated with said frame, at least one powered drive wheel associated with said frame, at least one motor powering said drive wheel, and a pin positioned in said at least one power base axle receiver;

aligning a longitudinal axis of said power base axle receiver with a longitudinal axis of said at least one wheelchair frame axle receiver; and inserting said pin into said at least one wheelchair axle receiver.

26. The method for converting a manually powered wheelchair to a powered wheelchair as disclosed in claim 25 further comprising connecting an anti-tip arm to said frame of said wheelchair and said power base frame, said anti-tip arm being resiliently compressible along its longitudinal axis.

27. The method for converting a manually powered wheelchair to a powered wheelchair as disclosed in claim 25 wherein said frame of said power base attachment comprises an adjustable portion having a first adjustment portion that adjusts a height of said power base axle receiver relative to said rigid portion of said frame and a second adjustment portion that adjusts a lateral position of said power base axle receiver.

28. The method for converting a manually powered wheelchair to a powered wheelchair as disclosed in claim 25 further comprising mounting a manually operable controller to said frame of said power base attachment.

29. The method for converting a manually powered wheelchair to a powered wheelchair as disclosed in claim 28 further comprising controlling a direction of said wheelchair with said manually operable controller.

30. The method for converting a manually powered wheelchair to a powered wheelchair as disclosed in claim 28 further comprising controlling a of said wheelchair with said manually operable controller.

* * * * *